United States Patent [19]
Kunii et al.

[11] Patent Number: 5,050,436

[45] Date of Patent: Sep. 24, 1991

[54] ULTRASONIC PROBE AND ACOUSTIC LENS ATTACHMENT

[75] Inventors: Yutaka Kunii; Yusiti Kikuti, both of Nishinasunomachi, Japan

[73] Assignee: Kabushiki Kaisha Toshiba, Kawasaki, Japan

[21] Appl. No.: 479,241

[22] Filed: Feb. 13, 1990

[30] Foreign Application Priority Data

Feb. 14, 1989 [JP] Japan .................................. 1-34401

[51] Int. Cl.[5] .............................................. G01N 29/00

[52] U.S. Cl. ...................................................... 73/644

[58] Field of Search ................ 73/644, 606, 623, 642; 128/662.03, 662.05, 663.01

[56] References Cited

U.S. PATENT DOCUMENTS 4,387,720 6/1983 Miller .................................. 73/644
4,794,930 1/1989 Machida et al. ...................... 73/644
4,867,169 9/1989 Machida et al. ............... 128/662.03

FOREIGN PATENT DOCUMENTS 57-136304 8/1982 Japan .

*Primary Examiner*—Hezron E. Williams
*Assistant Examiner*—Louis M. Arana
*Attorney, Agent, or Firm*—Cushman, Darby & Cushman

[57] ABSTRACT

An ultrasonic probe includes an ultrasonic probe body and an acoustic lens attachment detachably fitted on the ultrasonic probe body. The attachment includes an acoustic lens, and the lens is in contact with electrical-/acoustic transducer elements formed in the probe body but is partially separated from the probe body to form air gaps. The air gaps constitute escape portions, respectively. The air gaps are defined by parts of acute-angled surfaces of the probe body, obtuse-angled surfaces of connecting portions of the attachment, and tight contact portions of the attachment. The tight contact portions are perfectly in tight contact with the probe body, so that a medium is moved to the escape portions. The medium can be uniformly spread to form a thin medium layer. Bubbles are not formed in the tight contact portions, and the acoustic lens does not locally project. A two-dimensionally uniform acoustic refractive index can be obtained.

16 Claims, 3 Drawing Sheets

ULTRASONIC PROBE AND ACOUSTIC LENS ATTACHMENT

Background of the Invention

1. Field of the Invention

The present invention relates to an ultrasonic probe and an acoustic lens attachment which are used in medical diagnosis and nondestructive tests.

2. Description of the Related Art

A typical example of an apparatus employing an ultrasonic probe is an ultrasonic diagnosis apparatus. An ultrasonic probe used in this apparatus comprises electrical/acoustic transducer elements aligned with each other, an acoustic lens mounted on the plurality of the transducer elements, and a matching layer inserted between the acoustic lens and the transducer elements to acoustically match the acoustic lens with the transeducer elements. Ultrasonic waves generated by the tranducer elements can be focused by an electronic transmission/reception delay control in an oscillator aligning direction and can be focused by the acoustic lens in a direction (to be referred to as a lens direction hereinafter) perpendicular to the element aligning direction.

A focal point in the lens direction is unique to an acoustic lens of each probe. A doctor must replace the probe with an optimal probe to focus the ultrasonic waves on a desired focal point for various kinds of ultrasonic diagnosis, thus overloading the doctor.

A conventional ultrasonic probe which solved the above problem is disclosed in Published Unexamined Utility Model Application No. 57-136304. This probe comprises a probe body and an attachment detachably mounted on part of the probe body and having an acoustic lens. The focal point of the ultrasonic waves is changed to a desired position by this attachment. The attachment is fitted on the probe body so as to cover a matching layer of the probe body. The attachment comprises a cylinder with a bottom. The attachment has four side surfaces which are brought into contact with the side surfaces of the probe body and one wall which is brought into contact with a probe body surface having a matching layer, thereby constituting a space in which the top surface of the probe body is fitted. An acoustic lens is formed at an attachment portion which is brought into tight contact with the matching layer.

With the above structure, a desired focal point can be obtained by only the probe body. An ultrasonic medium such as olive oil or an ultrasonic jelly serving as a matching agent for allowing easy transmission of an ultrasonic wave is applied to the surface of the matching layer of the probe body or the surface of the acoustic lens of the attachment. The attachment is then fitted on the probe body, and a focal point different from that obtained by the probe body can be obtained. That is, if the focal point of the probe body itself on which the attachment is not fitted is defined as F1, the focal point can be changed to a focal point F2 when the attachment is fitted on the probe body.

However, since the acoustic lens of the attachment is brought into tight contact with the matching layer of the probe body, the jelly medium inserted between them cannot be uniformly spread, thus resulting in a nonuniform distribution in which thick and thin jelly portions are present and in local lens projection. For this reason, the actual focal point deviates from the desired focal point, or a desired acoustic field cannot be obtained. Therefore, image degradation occurs. In addition, the jelly medium appears from a portion between the acoustic lens and the matching layer in a thin layer to contaminate a peripheral portion. Therefore, the doctor cannot easily handle the probe with the attachment.

SUMMARY OF THE INVENTION

It is an object of the present invention to provide an ultrasonic probe and an acoustic lens attachment, wherein an ultrasonic medium inserted between a probe body and an attachment does not appear from the attachment and can be uniformly spread in a thin layer to obtain a desired focal point, and at the same time the operation load of a doctor can be reduced. This object can be achieved by the following ultrasonic probe. That is, an ultrasonic probe comprises:

a probe body including electrical/acoustic transducer elements, a matching layer formed on surfaces of the transducer elements, and a first acoustic lens formed on the matching layer, the probe body being provided with acute-angled surfaces from the transducer elements to the matching layer and the first acoustic lens to focus ultrasonic waves from the oscillators to one focal point through the matching layer and the first acoustic lens; and an attachment mounted on the probe body to cover parts of the matching layer and the first acoustic lens, the attachment being provided with tight contact portions which have edge portions brought into contact with an outer surface of the probe body and have projections on edges thereof, a second acoustic lens, an inner surface of which has a larger curvature than that of an outer surface of the first acoustic lens, the second acoustic lens being able to set a focal point different from the one focal point when the second acoustic lens is mounted on the first acoustic lens, and connecting portions for connecting the second acoustic lens and the tight contact portions through obtuse-angled surfaces and for forming escape portions for causing an ultrasonic transmission medium to escape, the escape portions being defined by at least the acute-angled surfaces, the obtuse-angled portions, and surface portions of the tight contact portions which are not brought into tight contact with the probe body.

The above object can also be realized by the following ultrasonic probe. An ultrasonic probe comprises:

an ultrasonic probe body having at least electrical/acoustic transducer means; and an attachment including an acoustic lens which can be brought into contact with at least wave receiving/-transmitting surfaces of the electrical/acoustic transducer means of the ultrasonic probe body, the attachment being detachable from the probe body, wherein air gaps are partially formed between the attachment and the electrical/acoustic transducer means.

The above object can further be realized by the following acoustic lens attachment. An acoustic lens attachment comprises a cylinder having a bottom and an acoustic lens formed of a silicone rubber material at least at the bottom, and is mounted on an ultrasonic wave transmission/reception side of an ultrasonic probe body through an opening of the acoustic lens attachment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B show a part of an ultrasonic probe according to an embodiment of the present invention, in which FIG. 1A is a schematic sectional view showing a state wherein an attachment is perfectly fitted on a probe body, and FIG. 1B is a schematic sectional view showing a state wherein the attachment is imperfectly fitted on the probe body;

DETAILED DESCRIPTION OF THE PREFERRED EMBODIMENTS

Figure 1A:
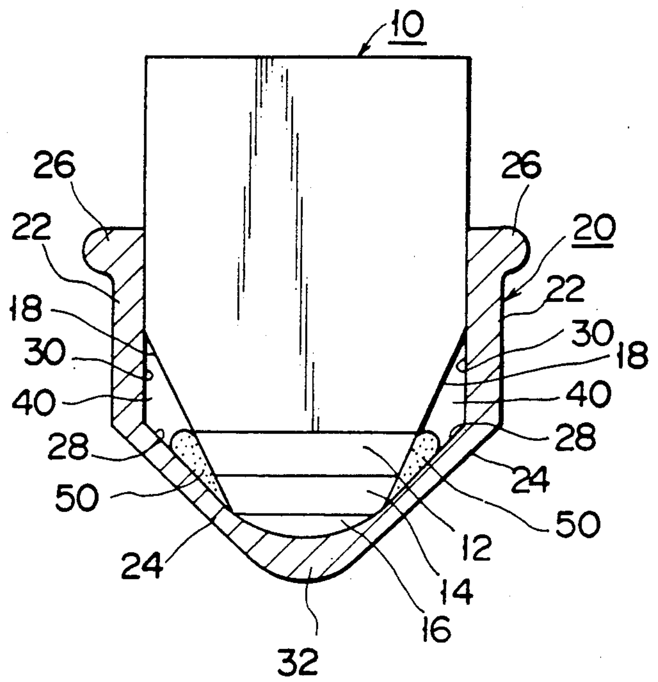

FIG. 1A is a sectional view showing a state wherein an attachment 20 is perfectly fitted on a probe body 10. An ultrasonic probe of this embodiment comprises a probe body 10 and an attachment 20 detachably fitted on the probe body 10. The probe body 10 has, e.g., electronic scan array type oscillators (electrical/acoustic transducer elements) 12, a matching layer 14 formed on the surfaces of the transducer elements 12, and a first acoustic lens 16 formed on the matching layer 14. The probe body 10 has acute-angled surfaces 18 extending from the transducer elements 12 to the matching layer 14 and the first acoustic lens 16 and focuses ultrasonic waves from the transducer elements 12 to a far position through the matching layer 14 and the first acoustic lens 16.

The attachment 20 comprises a cylinder having a bottom and an open end through which the probe body 10 is inserted. The bottom portion of the attachment 20 serves as an acoustic lens 32. The attachment 20 mainly has tight contact portions 22, connecting portions 24, and the second acoustic lens 32. Edge portions of the tight contact portions 22 are brought into tight contact with the outer surface of the probe body 10. The tight contact portions 22 have projections 26 at their edges, respectively.

The curvature of the inner surface of the second acoustic lens 32 is larger than that of the outer surface of the first acoustic lens 16. When the second acoustic lens 32 is fitted on the first acoustic lens 16, the focal point is changed to the far focal point. The connecting portions 24 connect the second acoustic lens 32 and the tight contact portions 22 through obtuse-angled surfaces 28. The acute-angled surfaces 18, the obtuse-angled surfaces 28, and surface portions 30 of the tight contact portions which are not brought into tight contact with the probe body 10 constitute escape portions 40 for causing a jelly-like medium 50 to escape. The medium 50 transmits ultrasonic waves.

The attachment 20 is fitted on the probe body 10 to partially cover the matching layer 14 and the first acoustic lens 16. The attachment 20 is made of a material such as silicone rubber and its projections 26 are held by fingers.

In the probe having the above arrangement according to this embodiment, the escape portions 40 are defined by parts of the acute-angled portions 18 of the probe body 10, the obtuse-angled surfaces 28 of the connecting portions 24 of the attachment 20, and the tight contact portions 22 of the attachment 20. In addition, the tight contact portions 22 can be perfectly brought into tight contact with the probe body 10, so that the jelly-like medium 50 can escape into the escape portions 40, respectively, thereby easily spreading the jelly-like medium 50 uniformly. Without forming bubbles or causing projection in the tight contact portions 22, a two-dimensionally uniform acoustic reflective index can be obtained.

Since the projections 26 are formed at the edges of the tight contact portions 22, respectively, the operator can firmly hold the ultrasonic probe with the projections 26 and can easily insert or remove the probe body 10 into or from the attachment 20, which allows uniform spreading of the medium 50 on the entire surfaces. In addition, the probe body 10 can be brought into good contact with the attachment 20.

In this case, since the attachment 20 is made of silicone rubber or the like to improve contact between the probe body 10 and the attachment 20, nonuniform distribution of the medium 50 and projection of the second acoustic lens 32 can be prevented.

Since the curvature of the inner surface of the second acoustic lens 32 of the attachment 20 is larger than that of the outer surface of the first acoustic lens 16 of the probe body 10, when the first acoustic lens 16 is brought into contact with the second acoustic lens 32, the probe body 10 is brought into contact with the attachment 20 while the medium 50 is smoothly moved to the escape portions 40. The medium 50 can be made uniform and thin. As a result, nonuniform distribution of the medium 50 can be prevented, and a desired focal point can be set. In addition, the load on the operator can be reduced.

Figure 1B:
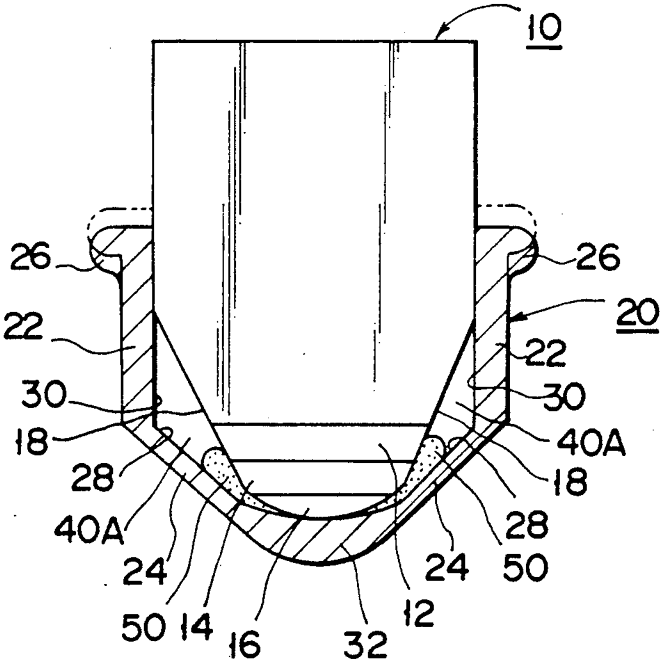

FIG. 1B is a sectional view showing a state wherein the attachment 20 is imperfectly fitted on the probe body 10. In this transient state, since the curvature of the first acoustic lens 16 is different from that of the second acoustic lens 32, larger escape portions 40A than those obtained in a perfect fitting state of FIG. 1A can be formed. A contact portion between the first and second acoustic lenses 16 and 32 is taken into consideration. Perfect surface contact is achieved in the perfect fitting state of FIG. 1A. In the case of an imperfect fitting state of FIG. 1A, only the top portion of the first acoustic lens 16 is in contact with the bottom portion of the second acoustic lens 32. Portions which are in a noncontact state are included in the escape portions 40A. Broken lines in FIG. 1B indicate imaginary positions of the projections 26 when the attachment 20 is perfect fitted on the probe body 10.

With this arrangement, the medium 50 can be smoothly moved to the escape portions, respectively.

Figure 2:
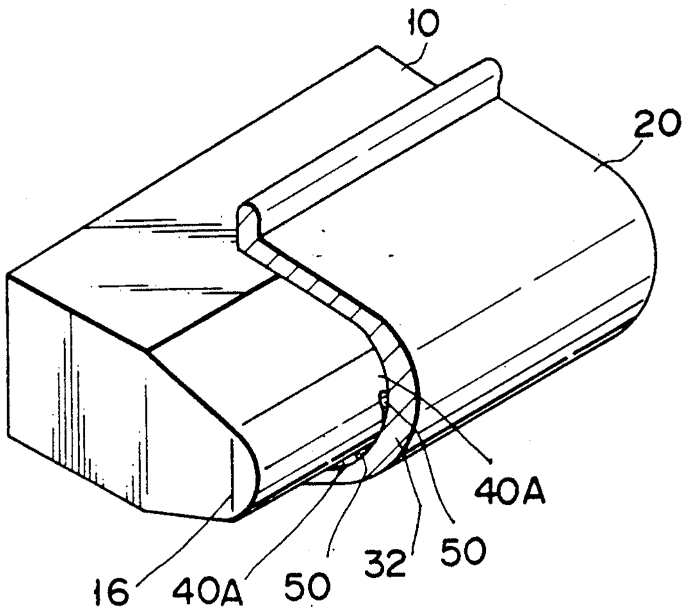
FIG. 2 is a perspective view illustrating a state wherein the attachment is perfectly fitted on the probe body.
Figure 3:
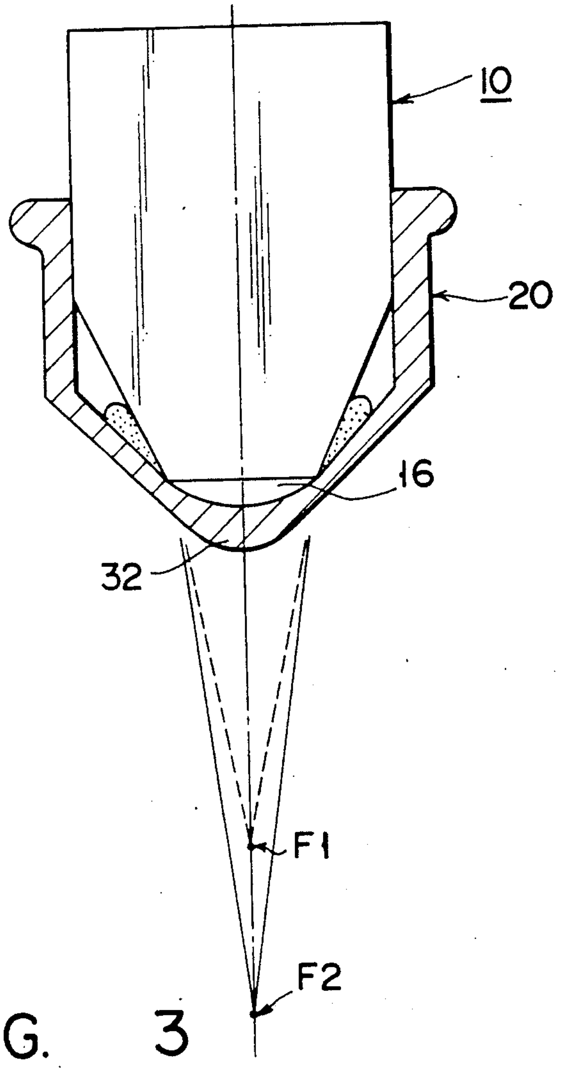
FIG. 3 is a schematic sectional view showing a change in focal point by the ultrasonic probe of the embodiment.

FIG. 2 is a perspective view showing the state of FIG. 1B. FIG. 3 shows a change in focal point when the attachment 20 is perfectly fitted on the probe body 10 in FIG. 1A. The focal point of the probe body 10 is F1, but is changed to F2 when the attachment 20 is perfectly fitted on the probe body 10.

FIG. 1B shows an intermediate state obtained prior to the perfect fitting state of FIG. 1A. However, an attachment including the second acoustic lens 32 having a larger curvature than that of the first acoustic lens 16 may be used, and the state in FIG. 1B may be obtained in an imperfect fitting state.

Figure 4:
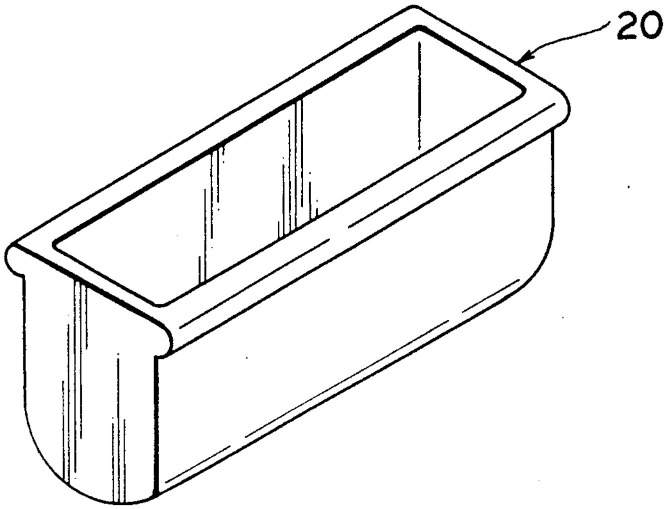
FIG. 4 is a perspective view showing the attachment of the embodiment.

FIG. 4 is a perspective view best showing the overall shape of the attachment 20. The attachment 20 comprising a cylinder having a bottom and made of silicone rubber or the like can be easily manufactured by a known resin molding method such as injection molding.

Figure 5:
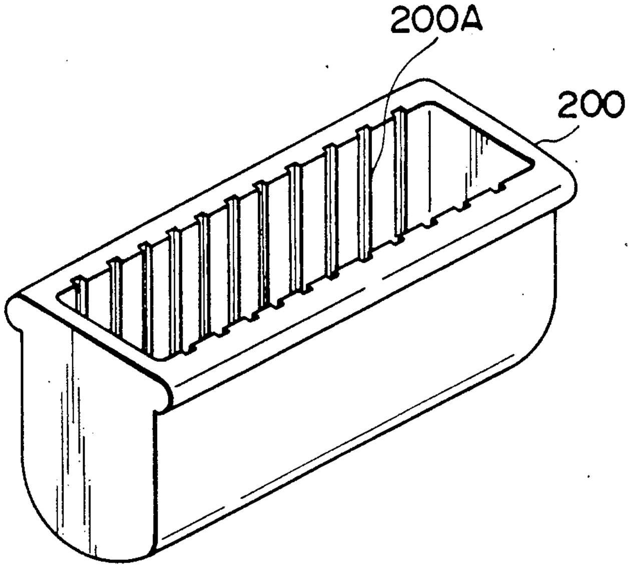
FIG. 5 is a perspective view of an attachment according to another embodiment of the present invention.

FIG. 5 is a perspective view best illustrating the overall shape of an attachment 200 according to another embodiment. The attachment 200 has a plurality of grooves 200A on its inner surface (corresponding to the portions 30 in FIGS. 1A and 1B). Flexibility of the attachment 200 can be improved by forming the plurality of grooves 200A and can be easily fitted on an ultrasonic probe body 10.

As has been described above, according to the present invention, the ultrasonic medium inserted between the probe body and the attachment does not appear from the attachment and can be uniformly spread to form a thin medium layer. A desired focal point can be set, and the load on the operator can be reduced.

The present invention is not limited to the particular embodiments described above. Various changes and modifications may be made within the spirit and scope of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An ultrasonic probe comprising:

a probe body including an electrical/acoustic transducer element, a matching layer formed on a surface of said transducer elements, and a first acoustic lens formed on said matching layer, said probe body being provided with acute-angled surfaces from said transducer elements to said matching layer and said first acoustic lens to focus ultrasonic waves from said transducer elements to one focal point through said matching layer and said first acoustic lens; and an attachment mounted on said probe body to cover parts of said matching layer and said first acoustic lens, said attachment being provided with tight contact portions which have edge portions brougt into contact with an outer surface of said probe body and have projections on edges thereof, said attachment also being provided with a second acoustic lens, an inner surface of which has a larger curvature than that of an outer surface of said first acoustic lens, said second acoustic lens setting a focal point different from said one focal point when said second acoustic lens is mounted on said first acoustic lens, and connecting portions for connecting said second acoustic lens and said tight contact portions through obtuse-angled surfaces and for forming escape portions into which an ultrasonic transmission medium disposed between the first acoustic lens and the second acoustic lens can escape, said escape portions being defined by at least said acute-angled surfaces, said obtuse-angled portions, and surface portions of said tight contact portions which are not brought into tight contact with said probe body.

2. A probe according to claim 1, wherein the escape portions are formed only at both sides of a contact portion between said first acoustic lens and said second acoustic lens.

3. A probe according to claim 1, wherein said attachment comprises a cylinder cap having a bottom and is fitted on said ultrasonic probe body from an ultrasonic wave transmitting/receiving side of said ultrasonic probe body through an opening of said attachment.

4. An ultrasonic probe comprising:

an ultrasonic probe body having at least electrical/acoustic transducer means; and an attachment including an acoustic lens which can be brought into contact with at least wave receiving/transmitting surfaces of said electrical/acoustic transducer means of said ultrasonic probe body, said attachment being detachable from said probe body, wherein air gaps are partially formed between said attachment and said electrical/acoustic transducer means, an ultrasonic transmission medium disposed between the wave receiving/transmitting surfaces and the acoustic lens escapable into said air gaps.

5. A probe according to claim 4, wherein said ultrasonic probe body includes an acoustic lens formed on transducer elements through a matching layer.

6. A probe according to claim 4, wherein said transducer means comprises a plurality of ultrasonic oscillators aligned with each other.

7. A probe according to claim 4, wherein said attachment comprises a cap having a bottom and is fitted on said ultrasonic probe body from an ultrasonic wave transmitting/receiving side of said ultrasonic probe body through an opening of said attachment.

8. A probe according to claim 4, wherein said attachment comprises a cap having a bottom, said cap being provided with projections at edges of an opening therof and an acoustic lens at said bottom and being fitted on an ultrasonic wave transmission/reception side of said ultrasonic wave probe body through said opening.

9. A probe according to claim 4, wherein said attachment is made of a silicone rubber material.

10. A probe according to claim 4, wherein said attachment comprises a cap having a bottom and an acoustic lens formed at least at said bottom and made of a silicone rubber material and which can be fitted on said ultrasonic probe body from an ultrasonic wave transmission/reception side of said ultrasonic probe body through said opening.

11. A probe according to claim 4, wherein said attachment comprises a cap having a bottom and an acoustic lens formed at least at said bottom and made of a silicone rubber material, said attachment having a plurality of grooves on inner side surfaces thereof and being attachable to said ultrasonic probe body from an ultrasonic wave transmission/reception side of said ultrasonic probe body through said opening.

12. A probe according to claim 4, wherein the air gaps are formed only at both sides of a portion between a surface of said acoustic lens and the ultrasonic wave transmission/reception surface of said ultrasonic probe body.

13. An acoustic lens attachment comprising a cap having a bottom and an acoustic lens formed at least at said bottom, said attachment being fitted on an ultrasonic probe body from an ultrasonic wave transmission/reception side through an opening of said attachment, said attachment fitting said ultrasonic probe body such that gaps are provided between said acoustic lens and the ultrasonic wave transmission/reception side into which an ultrasonic transmission medium disposed between said acoustic lens and said probe body can escape.

14. An attachment according to claim 13, wherein projections are formed at edges of said opening.

15. An attachment according to claim 13, wherein grooves are formed on inner side surfaces of said attachment.

16. An attachment according to claim 13, wherein said acoustic lens is made of a silicone rubber material.

* * * * *